United States Patent

Nagasaki

[11] 3,900,248
[45] Aug. 19, 1975

[54] LIQUID CRYSTAL DISPLAY DEVICE

[75] Inventor: Osamu Nagasaki, Narashino, Japan

[73] Assignee: Kabushiki Kaisha Suwa Seikosha, Japan

[22] Filed: Sept. 11, 1973

[21] Appl. No.: 396,310

[30] Foreign Application Priority Data
Sept. 11, 1972 Japan.............................. 47-90351

[52] U.S. Cl............................ 350/160 LC; 350/150
[51] Int. Cl. ............................................. G02f 1/16
[58] Field of Search...................... 350/150, 160 LC

[56] References Cited
UNITED STATES PATENTS

| | | | |
|---|---|---|---|
| 3,503,670 | 3/1970 | Kosanke et al. | 350/150 |
| 3,551,026 | 12/1970 | Heilmeier | 350/150 |
| 3,597,044 | 8/1971 | Casellano | 350/160 LC |
| 3,680,950 | 8/1972 | Haas et al. | 350/150 |
| 3,703,329 | 11/1972 | Castellano et al. | 350/150 |
| 3,756,694 | 9/1973 | Soref et al. | 350/160 LC |
| 3,806,227 | 4/1974 | Greubel et al. | 350/150 |

Primary Examiner—Edward S. Bauer
Attorney, Agent, or Firm—Robert E. Burns; Emmanuel J. Lobato; Bruce L. Adams

[57] ABSTRACT

A liquid crystal display device is disclosed utilizing liquid crystals which align in response to electrical charges. To improve contrast between charged and non-charged areas means effecting changes in the electric vector of the transmitted or reflected light are interposed adjacent to the liquid crystal. Retardation plates of the quarter- and half-wave type are used to change the electric vector. The use of dichroic liquid crystals or the combination of liquid crystals and dichroic dyes is also disclosed.

9 Claims, 7 Drawing Figures

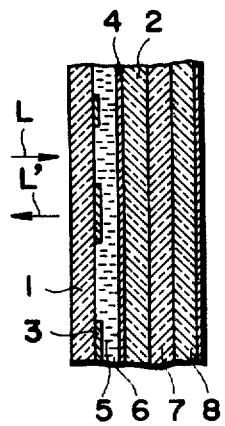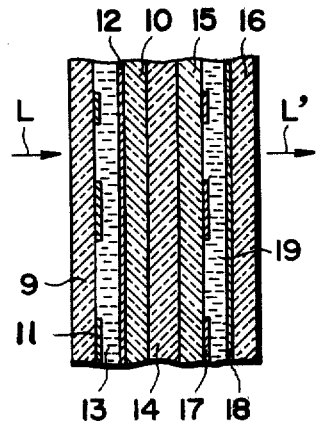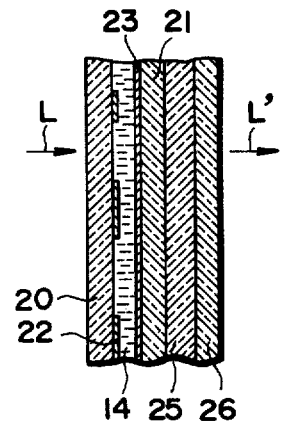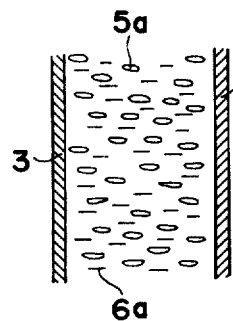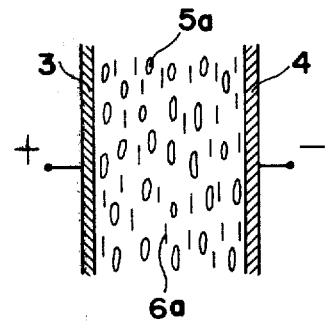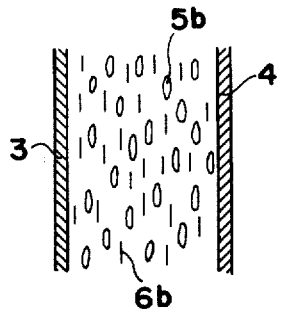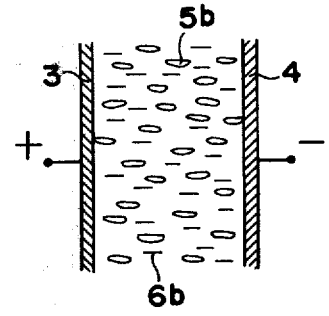

3,900,248

LIQUID CRYSTAL DISPLAY DEVICE

FIELD OF THE INVENTION

The present invention relates to electrically energized information display devices and more particularly to display devices utilizing compositions of liquid crystals as display forming materials which are effected by optical means for changing the electric vector of light after passage through the liquid crystal compositions.

BACKGROUND OF THE INVENTION

In conventional display devices utilizing liquid crystal materials the liquid crystal material is contained in the space between two plates having electrodes positioned thereon. At least one of the plates is transparent. The other plate may also be transparent or may be reflecting. On applying an electrical charge to the electrodes, molecules of the liquid crystal material subject to the charge generated by the electric field, change their orientation and in response to incident light form images such as display numerals, letters, characters, marks or the like in the turbid liquid crystal material.

Such conventional devices have common drawbacks. The contrast between the character and the background is relatively poor. A high voltage is required to form the character. Often the useful lifetime of the liquid crystal materials when exposed to high voltage or potential is relatively short.

In a known device, two polarizing plates are employed for changing the character of the incident light upon and through the liquid crystal. However, in such a device at least approximately 50 percent of the incident light is absorbed by the polarizing plates and therefore because of such loss of incident light, the contrast of the formed images is relatively poor.

It is a prime object of this invention to eliminate the above mentioned disadvantages and particularly to improve the contrast of the images formed when viewed by either transmitted or reflected light. Other objects will be apparent from the following description.

THE INVENTION

The present invention contemplates providing a liquid crystal optical image display device comprising a light source and a liquid crystal-containing cavity defined by a pair of parallel plates at least one of which is transparent. Said plates should have electrode elements upon the surfaces adjacent to the liquid crystal. The liquid crystal contained in the cavity is of a type which changes its orientation in response to an electrical field which is impressed upon the electrodes elements on the parallel plates. At least one of the electrode elements is segmented and each segment is separately connected to a source of electrical potential to provide an electrical charge between the individual segments of the segmented electrode and the other electrode. As a result of the charge, the orientation of the liquid crystal is changed so as to modify its light transmitting characteristics.

The light from a light source shing through the transparent electrode plate and the liquid crystal compositions then has its electric vector changed by an optical means for changing the electric vector of the light. These are commonly referred to as "retardation plates." Generally these are available as half-wave plates or quarter-wave plates.

DETAILED DESCRIPTION OF THE INVENTION

The characteristic features of the present invention will will become evident and more readily understood from the following description, taken in conjunction with the accompanying drawings, in which;

FIG. 1 is a sectional view of an embodiment of the present invention;

FIG. 2 comprising FIG. 2A and FIG. 2B is a schematic showing of one type of liquid crystal composition having specific orientations in the charged and uncharged condition.

FIG. 3 comprising FIGS. 3A and 3B is a schematic showing of another type of liquid crystal composition having an opposite orientation;

FIG. 4 is a sectional view of another embodiment of the present invention; and

FIG. 5 is a sectional view of still another embodiment of the present invention.

Referring particularly to FIG. 1, plates 1, and 2 are made of a transparent material such as glass and are parallel and face each other in spaced relationship to define the cavity for the liquid crystal. Plates 1 and 2 have transparent electroconductive films 3, and 4 respectively, formed on their inner surfaces by either a vacuum evaporation of oxidized tin or indium or similar methods of deposition of transparent electroconductive films.

Electroconductive film 3 is preferably segmented in order to provide desired segmented elements to form characteristic characters or numerals or sections of numerals or information conveying characters. Each segment is provided with conductive leads in a manner known to the art so that individual areas may be activated and provided with an electrical charge. Opposite electrode 4, need not be segmented. Liquid crystal composition 5 is introduced into the cavity between plates 1 and 2. This liquid crystal composition 5 may be any of the conventional liquid crystal compositions which are used for electrical display devices and which in response to electrical fields change their spatial orientation. Preferably this liquid crystal composition should include liquid crystals which are dichroic or the composition should contain liquid crystals in combination with a dichroic coloring matter 6.

It is preferred, in order to intensify the contrast of the images formed, that the molecular axis of the liquid crystal be initially oriented in a single direction. Such orientation may be provided by rubbing the inside surface of at least one of the electrodes in a single direction with a cloth wetted by a weak solution of lecithin. This provides an initial orientation charge. Alternatively the electrodes can be coated with an insulating fluro plastic coating which is then charged by rubbing in a single direction. This method of liquid crystal orientation is described in U.S. Pat. application Ser. No. 338,625. By such orientation treatments, the liquid crystal molecules shown in FIG. 2 at 5A and the coloring matter molecules 6A are oriented perpendicular to the electrode plates 1, 2 as shown in FIG. 2A when the electrical field is not applied to electrodes 3 and 4, and they are directed parallel to the electrode plates 1 and 2 as shown in FIG. 2B when subjected to an electrical field by electrodes 3 and 4.

A quarter-wave plate 7 which serves as the means for changing the electric vector of light is juxtaposed on the rear surface of electrode plate 2 distal to the liquid crystal-composition 5. A reflecting surface 8 is juxtaposed adjacent to the exit side of quarter wave plate 7. Any direct reflecting surface such as a front or rear surface mirror or a diffuse matte reflecting surface such as white paper or ground glass may be used. Preferably a mirror is used.

As transparent electrode forming materials either tin oxide or indium oxide films may be used. These films are preferably vacuum-deposited upon the surfaces of the plates 1 and 2 to form and define the liquid crystal-containing cavity. The two electrodes comprising an electrode set are formed in a manner that at least one electrode of the set is segmented into information conveying characters, each of said segments being independly connected to via switching means to a source of electric potential for generating a charge between the opposing electrodes.

The liquid crystals used for the compositions filling cavity 5 between electrodes 1 and 2 are preferably either of a dichroic nature or are combined with dichroic dyes. The use of the dichroic phenomena has been found, according to one aspect of this invention, to augment the increase in contrast between the charged characters and the uncharged background. The liquid crystal materials which exhibit dichroic characteristics are those which include an azo or a azoxy moiety as its central group. Liquid crystals which in combinatin with dichroic dyes, are combinations comprising, for example 30% of $CH_3-O-\langle O \rangle-CHN\langle O \rangle-C_4H_9$ and 70% of $C_2H_5-\langle O \rangle-CHN\langle O \rangle-C_4H_9$ to this is added 1–10 percent of a dichroic dye. Another example of a liquid crystal compositions used with dichroic dyes is a combination of 60% of $C_2H_5-O\langle O \rangle-CHN\langle O \rangle-C_4H_9$ and 40% of $CH_3-O-\langle O \rangle-CHN\langle O \rangle-C_4H_9$ To either of the above liquid crystal compositions may be added from 1 to 10 percent of dichroic dyes such as for example phenol blue or methyl red. The exact nature of the combination of the dyes with the liquid crystals is not fully understood. They may be adsorbed on the liquid crystals or they may chemically combine with the crystals. Liquid crystal compositions of the above type as shown in FIG. 2A have a general orientation in response to a static field, which permits the passage of light therethrough and obstructs passage in response to an electrically charged field as in FIG. 2B.

A different type of liquid crystal which has an opposite character, is shown in FIGS. 3A and B wherein in response to a static field, the liquid crystals obstruct the passage of light therethrough and in response to the imposition of the charge reorient and permit the passage of light. A liquid crystal composition for use in liquid crystal display devices of the latter type according to this invention, are exemplified by the following formulations.

40% of $CH_3-O-\langle O \rangle-CHN\langle O \rangle-C_4H_9$,

50% of $C_2H_5-O\langle O \rangle-CHN\langle O \rangle-C_4H_9$ and

10% of $CN-\langle O \rangle-CHN\langle O \rangle-C_4H_9$

From 1 to 10 percent of a dichroic dye as mentioned above may be combined with this liquid crystal composition for improved contrast according to one aspect of this invention.

As can be seen from FIG. 2 including FIGS. 2A and B wherein the liquid crystal material 5 is dichroic or contains a dichroic coloring matter 6, by the static rubbing treatment, the liquid crystal molecules 5A and the coloring matter molecules 6A are oriented perpendicular to electrode plates 1 and 2 by the initial static charge resulting from the rubbing operation. This is a condition when there is no applied electric field. The dye molecules are also directed perpendicular to the electrode plates. However, when an electrical field is applied, the liquid crystals and associated dyes are directed parallel to electrodes 1 and 2 as shown in FIG. 2B when the electric field is applied and light is transmitted therethrough.

The liquid crystal composition having the opposite character, as is illustrated in FIG. 3. The liquid crystal molecules 5B are initially aligned by the static charge imparted by rubbing to the cavity surfaces before insertion of the liquid crystal 5B therein. FIG. 3A shows that the initial alignment of the liquid crystal molecules 5B and the coloring matter 6B is parallel to electrode plates 1 and 2 when the external electrical field is not applied whereas the liquid crystal molecules 5B and the dichroic coloring dye 6B align perpendicularly to the electrode plates 1 and 2 as shown in FIG. 3B when the electric field is applied.

The quarter-wave plate or halfway plates used in accordance with the present invention are generically known as "retardation plates." Such plates have the property of changing the electric vector of light. (See "Optics" by F. W. Sears, Addison-Wesley Printing Company Inc., Reading, Mass.) As quarter-wave plate 7 in FIG. 1A $(n+¼)\pi$ wave plate may be used. ($n$ is an integer). As a half-wave plate, a plate $(n+½)\pi$plate may be used ($n$ is an integer). This indicates that the quarter-wave plate will change the electric vector of light by 45° and the half-wave plate will change the electric vector of light by 90°. Such plates are commercially available optical components.

FIG. 4 shows another embodiment of the present invention. The plates 9, 10; electroconductive films 11, 12 and the liquid crystal composition 13 contains dichroic coloring matter are assembled as in the embodiment of FIG. 1. A half-wave plate 14 is positioned adjacent to plate 10. Further plates 15, 16 electroconductive films 17, 18 and liquid crystal composition 19 are then assembled as shown on the other side of half-wave plate 14.

FIG. 5 shows a further embodiment. Electroconductive films 22 and 23 are formed on plates 20 and 21. The liquid crystal composition 24 is introduced into the space between plates 20 and 21. The half-wave plate 25 and a polarizing plate 26 are positioned as shown.

The operation of the embodiment in FIG. 1 is as follows: The liquid crystal 5, having the orientation characteristics of the composition as shown in FIG. 2 (the liquid crystal molecules 5A are initially oriented by static charge perpendicular to electrode plates 1 and 2. Therefore, any incident light, in the direction indicated by arrow L is not absorbed by the liquid crystal molecules. The light passes through the quarter-wave plate 7 and is reflected back by reflector 8. The reflected light again traverses through quarter-wave plate 7 in the reverse direction and again passes through liquid crystal composition 5 and plate 1 thus leaving the device in the direction of the arrow L', it is there observed. Since the regions not subjected to the electric field transmit light, the light emerges essentially colorless. On the other hand, in regions subjected to the electrode field impressed upon electrodes 3 and 4 by the electrical charge controlled potential switching means (not shown), the liquid crystal molecules are oriented parallel to the electrode plate. Therefore, rays of incident light having an electric vector directed along the longitudinal axes of the liquid crystal 5A is adsorbed. The ray of light, having an electric vector different from the longitudinal axes of molecule 5A passes through the transparent plate 1, dichroic liquid crystal composition 5 and plate 2. Then the electric vector of the light is changed circular by 45° by quarter-wave plate 7. The light is then reflected by reflecting plate 8 and then the light passes again through quarter-wave plate 7 where its electric vector is additionally changed by a further 45° to result in a 90° change. The direction of the electric vector then accords with the direction of the longitudinal axes of the liquid crystal molecules. Therefore the light, any which was not absorbed by during the first passage is completely absorbed by the reflective passage through the quarter-wave plate. If dichroic dyes having wide wave characteristics are employed, the incident light is almost completely adsorbed. Those areas of the display device where the external controlled electric field is applied appear to be black or very dark. Consequently, the contrast with the almost colorless uncharged areas is very good. Any characters or marks imparted by the segmented electrodes therefore are very clearly displayed.

When liquid crystal compositions having characteristic of the materials set forth in FIG. 3 above are employed, the images are reversed. The regions not subjected to the electric field look black or dark since the incident light is almost completely adsorbed whereas the regions subjected to the electric field are transparent and colorless and almost all of the light is completely reflected to the viewer.

Referring now to the operation of the device of FIG. 4, when the electric field is not applied, the liquid crystal molecules and color matter molecules are oriented parallel to plates 9, 10, 15 and 16. The light ray having an electric vector along the longitudinal axis of the liquid crystal molecules and the coloring matter molecules is adsorbed and the other light rays are transmitted through the liquid crystal 13. The electric vector of the transmitted light is changed by 90° when the light passes through the half-wave plate 14. And the light is adsorbed by liquid crystal 19 since the direction of the electric vector of the light accords with that of the liquid crystal molecules and the dichroic coloring matter. If the adsorption wave band of the dichroic dye is sufficiently broad, the incident light is almost completely adsorbed and those portions look black or dark and provide an excellent contrast to the oppositely charged areas.

In the case of FIG. 5 the polarizing plate 26 is employed in place of plate 15 and 16; the electroconductive plates 17 and 18 and the liquid crystal 19 of FIG. 4. Generally this embodiment operates in the same manner as the embodiment of FIG. 4. It results in a thinner display device but there is some light loss caused by the use of the polarizing filter element 26.

In general, an improvement in the operation of the devices of this invention with regard to life of both the electrodes and of the liquid crystalcomposition is obtained if the electroconductive films forming the electrodes on the plates are coated by an electrically insulating film. The coat on the surfaces of the actual electrode elements which are in contact with the liquid crystal composition prevents loss of the electrode material and prevents chemical breakdown of the liquid crystal composition as a result of electrochemical reactions initiated when charges are applied between the electrode plates. Such charges may, to some degree, permeate the liquid crystal via migratory ions.

All parts and percentages indicated above are by weight. Numerous modiications and embodiments of this invention may be made without departing from the spirit and scope thereof. It is to be understood that the invention is not limited to the various embodiments or formulations disclosed herein except as defined in the appended claims.

What is claimed is:

1. A high contrast liquid crystal optical image display device comprising a light source, means defining at least one cavity for containing liquid crystal compositions, comprising at least one pair of spaced apart parallel plates, each pair defining one cavity therebetween; a liquid crystal composition in each cavity, said composition containing a dichroic substance which absorbs a component of the light having an electric vector in a given direction when the substance is aligned parallel to said plates and transmits light without absorbtion when said dichroic substance is aligned perpendicular to said plate, said cavity being illuminated by said light source and at least one of said plates in each pair being light transmitting; each of said plates having transparent electric field-generating electrode means adjacent to said cavity; at least one of said electrode means being segmented into character forming elements; means for selectively imposing electric fields in individual segments; and retardation plate means for changing the electric vector of said light after initial passage through said liquid crystal cavity whereby causing said light to make a second passage through said liquid crystal cavity such that when said dichroic substance is aligned parallel to the plate, one electric vector of said incident light is absorbed during said initial passage and the othogonal electric vector component is absorbed during said second passage.

2. The device according to claim 1 wherein said means for changing the electric vector of light is at least one retardation plate.

3. The device according to claim 2 wherein said retardation plate is a quarter-wave plate.

4. The device according to claim 2 wherein said retardation plate is a half-wave plate.

5. The device according to claim 1 wherein said composition comprises a liquid crystal having dichlroic properties.

6. The device according to claim 1 wherein said composition comprises a liquid crystal in combination with a dichroic dye.

7. The device according to claim 3 adapted for viewing by reflected light, wherein said light from said source enters said cavity through said light transmitting parallel plate, said light having controlled traversal through said liquid crystal composition in areas wherein said liquid crystal is oriented in response to said electric field-imposing means, then traverses said quarter-wave plate and is reflected back through said quarter-wave plate, said liquid crystal composition, and light transmitting plate by a reflecting surface whereby the contrast of images formed in said oriented areas by said reflected light is increased.

8. The device according to claim 1 comprising at least three parallel light transmitting plates, defining two liquid crystal-containing cavities, at least two of said plates having segmented electrodes, said electric vector-changing means, in the form of a half-wave plate, being positioned between said two cavities to effect an increased contrast of images viewed by light transmitted from said light source.

9. The device according to claim 1 wherein said liquid crystal composition in said cavity is initially oriented by rubbing said parallel cavity-defining plates.

* * * * *

UNITED STATES PATENT OFFICE
CERTIFICATE OF CORRECTION

Patent No. 3,900,248        Dated 19 August 1975

Inventor(s) NAGASAKI

It is certified that error appears in the above-identified patent and that said Letters Patent are hereby corrected as shown below:

The assignee should read:

"Kabushiki Kaisha Seikosha"

Signed and Sealed this second Day of March 1976

[SEAL]

Attest:

RUTH C. MASON
Attesting Officer

C. MARSHALL DANN
Commissioner of Patents and Trademarks